Figure 1:
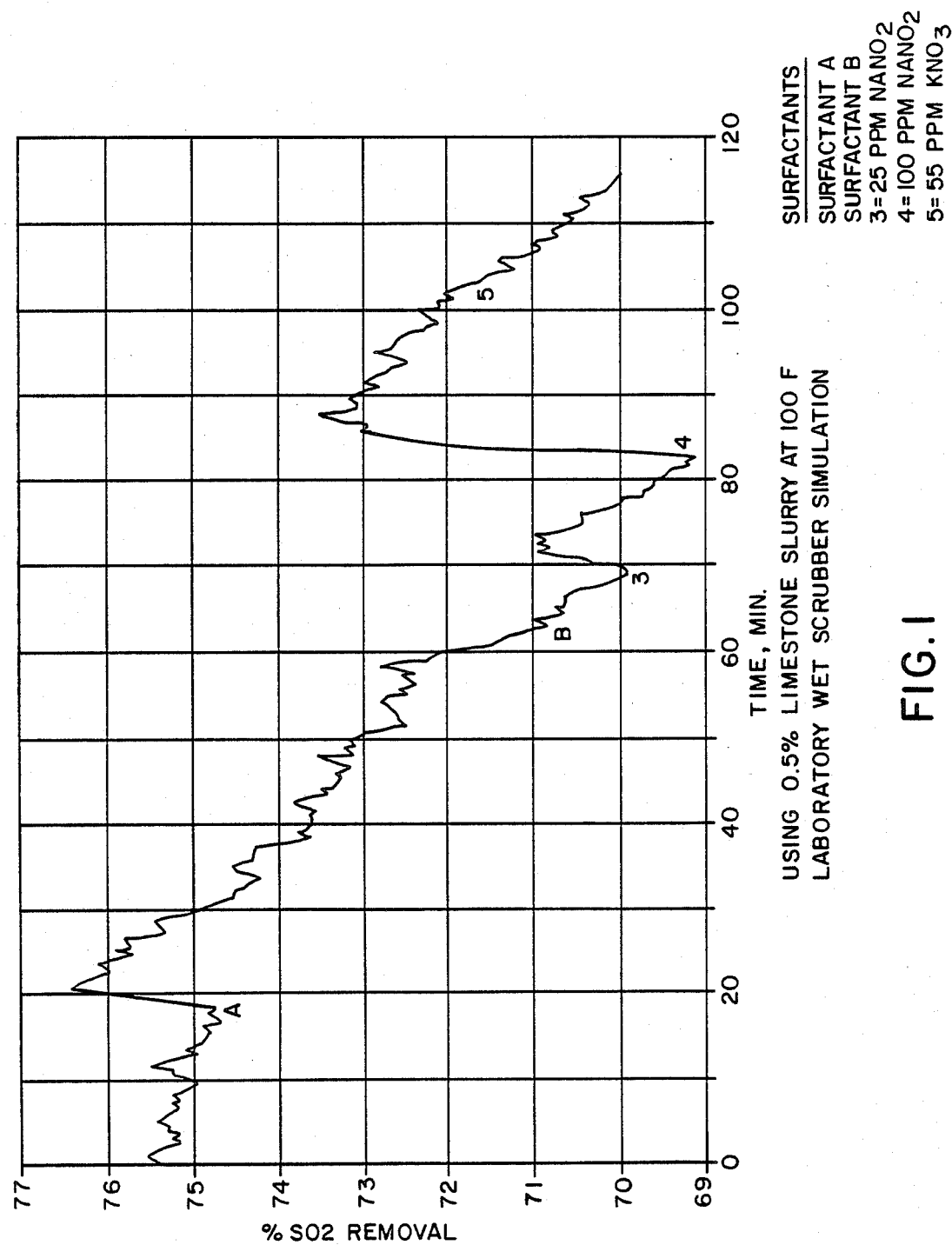

United States Patent [19]

Lin et al.

[11] Patent Number: 4,793,982

[45] Date of Patent: Dec. 27, 1988

[54] USE OF NITRITES TO ENHANCE $SO_2$ REMOVAL IN FLUE GAS DESULFURIZATION WET SCRUBBERS

[75] Inventors: Mei-Jan L. Lin; Edward W. Ekis, Jr., both of Naperville, Ill.

[73] Assignee: Nalco Chemical Company, Naperville, Ill.

[21] Appl. No.: 161,580

[22] Filed: Feb. 29, 1988

[51] Int. Cl.[4] ............................................. C01B 17/00
[52] U.S. Cl. ................................................... 423/242
[58] Field of Search .......... 423/242 A, 242 R, 244 A, 423/244 R

[56] References Cited

U.S. PATENT DOCUMENTS 3,632,306 1/1972 Villier-Fishu et al. .............. 423/243
3,786,136 1/1974 Axeborg .......................... 423/242 X
4,681,687 7/1987 Mouché et al. ..................... 210/764

OTHER PUBLICATIONS

"Improvement of Fly Ash Alkali Utilization in FGD Systems", by M. Lin, R. Mouché, E. Ekis & P. Nassos of Nalco Chemical Co., presented at the American Power Conference, Apr. 27–29, 1987.

Primary Examiner—Gregory A. Heller
Attorney, Agent, or Firm—John G. Premo; Donald G. Epple; Anthony L. Cupoli

[57] ABSTRACT

The $SO_2$ scrubbing efficiency of flue gas desulfurization scrubbers is improved when the scrubbing is conducted in the presence of a water-soluble nitrite salt.

2 Claims, 3 Drawing Sheets

USE OF NITRITES TO ENHANCE SO₂ REMOVAL IN FLUE GAS DESULFURIZATION WET SCRUBBERS

INTRODUCTION

Flue gases from utilities and industrial boilers are subject to wet scrubbers to remove $SO_2$ therefrom. This Flue Gas Desulfurization (FGD) process operates using a basic neutralizing substance such as lime, limestone or fly ash.

Sulfur dioxide removal efficiency is the key measure of any desulfurization process. More cost-efficient $SO_2$ removal can result in substantial savings in reagent utilization, energy consumption, equipment protection, and solids disposal. Improved $SO_2$ removal efficiency is a necessity for scrubbers operating at the margins of emission requirements. Improved efficiency is needed in all FGD scrubbers, and is especially important for limestone slurry systems since the stoichiometric efficiency of limestone is normally poor.

Organic acids such as dibasic acid (DBA) have been used as buffering/solubilizing agents to increase limestone slurry scrubbing efficiency. Although this technology has been known for some time, it is practiced by only a few power plants. Inexpensive waste DBA products are obtained from Nylon and cyclohexanone manufacturing processes.

Being a waste stream mother liquor, these DBA products suffer from non-uniformity of composition as well as precipitation and degradation. These problems add to the already inefficient high dosage requirements (typical 1,000–7,000 ppm continuous feed). DBA also solidifies at ambient temperature and seems to cause foaming in the scrubber. Concentrated DBA must be kept hot during transportation at 212°–266° F. (100°–130° C.) until reacting with scrubbing liquid.

Dibasic acids serve a dual function in the enhancement of $SO_2$ scrubbing. The acid functionality helps solubilize calcium carbonate particles into slurry liquid. Also, their characteristic pKa values (e.g. adipic acid, $Pka_1 = 4.26$, $pKa_2 = 5.03$) are generally in the pH control range of the recycled slurry. This provides extra buffer capacity to the bulk liquid.

Another method for improving scrubbing efficiency is to utilize certain surfactants. This inventive concept is described in Ser. No. 123,471, filed Nov. 20, 1987.

It is therefore an object of the invention to develop products which improve $SO_2$ removal and calcium carbonate dissolution more efficiently than DBA.

THE INVENTION

The invention is directed to a method of improving the $SO_2$ scrubbing efficiency of FGD scrubbers. The method comprises treating these scrubbers during the scrubbing operations with a water-soluble nitrite salt. The efficiency of the process is evidenced when the scrubbers contain lime, limestone or fly ash.

PRIOR ART

Nitrite is known to be an effective biocide for hydrogen sulfide odor and sulfate-reducing bacteria control in FGD sludge. This is described in U.S. Pat. No. 4,681,687. Application of nitrite biocide to FGD thickeners/ponds may get recycled back into the scrubber.

THE DRAWINGS

Figure 2:
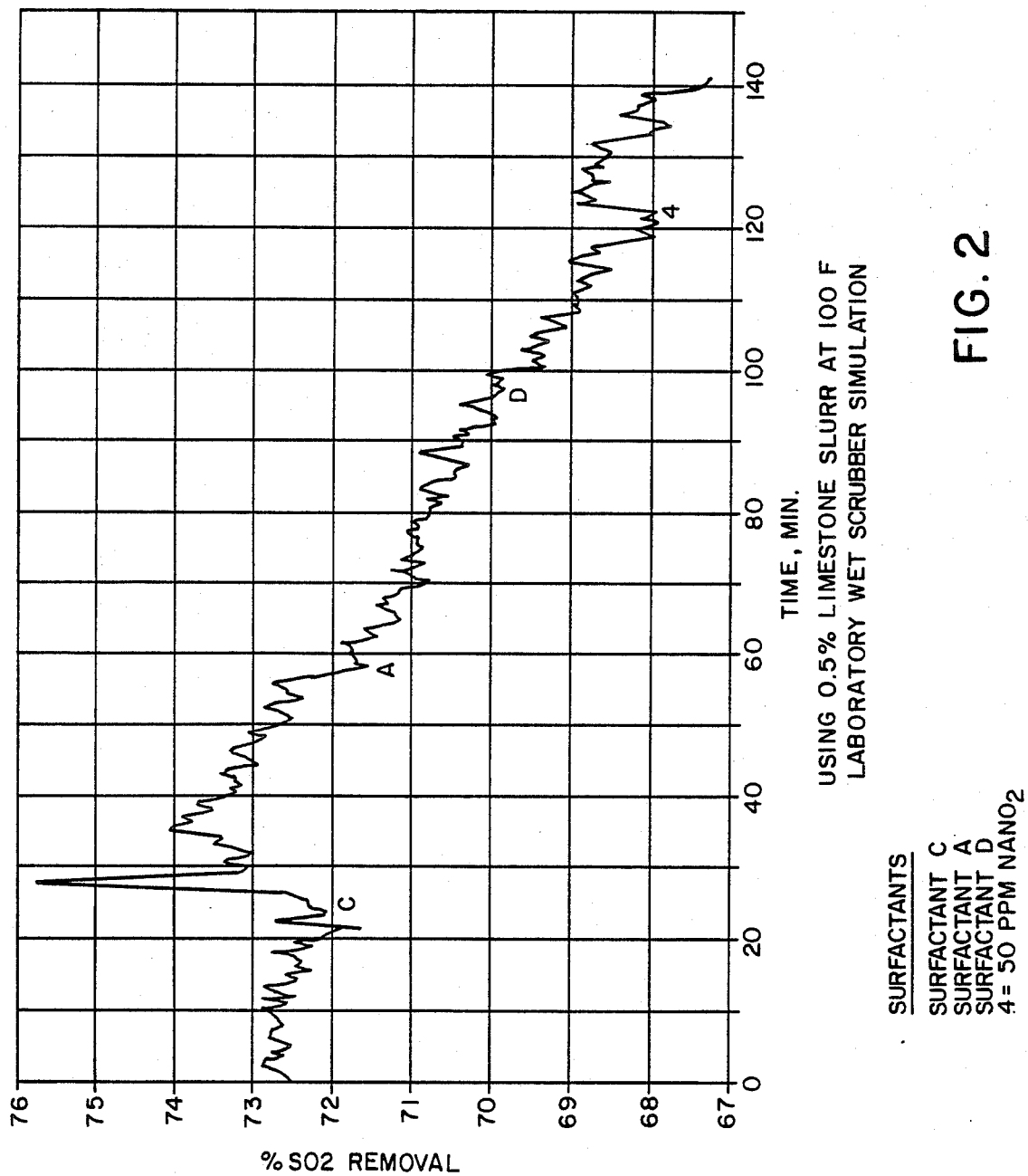
Figure 3:
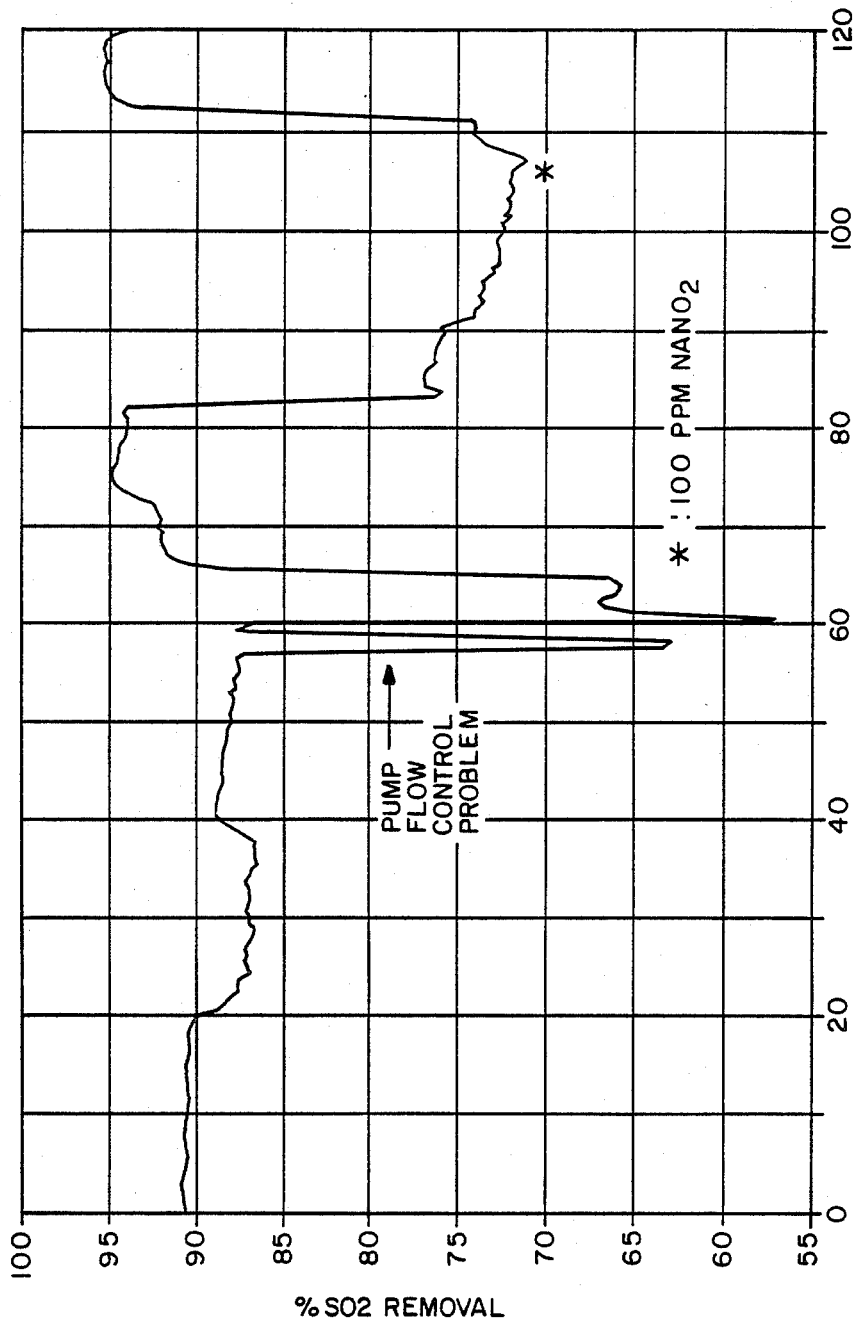

FIGS. 1 through 3 show graphically the benefits achieved using nitrite salts to improve flue gas scrubbing efficiency.

THE WATER-SOLUBLE NITRITE SALTS

These salts may be selected from any of the well-known water-soluble nitrites such as the alkali metal nitrites, e.g. sodium or potassium nitrite and the alkaline earth metal nitrites such as calcium nitrite. Sodium nitrite is preferred.

NITRITE DOSAGES

The nitrites are effective when used at a few ppm based on the weight of the scrubber slurry to be treated. Typical dosages range from as little as 10 ppm up to as much as 100 ppm. Good results are achieved at dosages ranging between 25–75 ppm.

EVALUATION OF THE INVENTION PROCEDURE

The $SO_2$ absorption module, or mini-scrubber, test design and operation are described in the paper "Improvement of Fly Ash Alkali Utilization in FGD Systems" by M. Lin, R. Mouché, E. Ekis, and P. Nassos of Nalco Chemical Company, presented at the American Power Conference, Apr. 27–29, 1987, which is incorporated herein by reference.

The mini-scrubber is typically run with 40 liters of slurry, 0.5%–1.5% solids concentration, ambient or 110° F., 5 cfm gas flow (mixed with air), and 700–2,500 ppm inlet $SO_2$ concentrations. Laboratory tap water of 300 'M' alkalinity was used to make up the slurry.

Using the above procedure and a 0.5% limestone slurry at 100° F., nitrite salts were tested varying dosages and compared against surfactants known to improve scrubbing efficiency. The results of these tests are shown in FIGS. 1, 2 and 3.

In the drawings, Surfactant A is a nonylphenoxypoly(ethoxy)ethanol, with 9.84% ethylene oxide and an HLB of about 2.5; Surfactant B is a nonylphenoxypoly(ethoxy) ethanol, with 16.67% ethylene oxide and an HLB of about 3.0; Surfactant C is a nonylphenoxypoly(ethoxy) ethanol, with 23.08% ethylene oxide and an HLB of about 3.5; and Surfactant D is an octylphenol ethoxylated ethanol with an HLB of 3.6, made by Rohm & Haas.

Having thus described our invention, we claim:

1. A method of improving the $SO_2$ scrubbing efficiency of flue gas desulfurization scrubbers which comprises conducting the scrubbing operation in such scrubbers in the presence of at least 10 ppm of a water-soluble nitrite salt.

2. The method of claim 1 where the water-soluble nitrite salt is sodium nitrite.

* * * * *